US012031366B2

(12) United States Patent
Lee

(10) Patent No.: US 12,031,366 B2
(45) Date of Patent: Jul. 9, 2024

(54) HINGE SYSTEM AND METHOD FOR A SEGMENTED DOOR

(71) Applicant: Overhead Door Corporation, Lewisville, TX (US)

(72) Inventor: Bradley J. Lee, Arlington, TX (US)

(73) Assignee: Overhead Door Corporation, Lewisville, TX (US)

( * ) Notice: Subject to any disclaimer, the term of this patent is extended or adjusted under 35 U.S.C. 154(b) by 16 days.

(21) Appl. No.: 17/562,663

(22) Filed: Dec. 27, 2021

(65) Prior Publication Data

US 2022/0120122 A1 Apr. 21, 2022

Related U.S. Application Data

(63) Continuation-in-part of application No. 16/912,086, filed on Jun. 25, 2020, now Pat. No. 11,851,930.

(51) Int. Cl.

*E05D 1/00* (2006.01)
*E05D 7/00* (2006.01)
*E05D 11/00* (2006.01)

(52) U.S. Cl.

CPC ................. *E05D 1/00* (2013.01); *E05D 7/00* (2013.01); *E05D 11/0054* (2013.01); *E05Y 2201/71* (2013.01); *E05Y 2900/106* (2013.01)

(58) Field of Classification Search

CPC ................ E05D 15/242; E05D 15/165; E05Y 2900/132; E05Y 2900/106; E06B 3/486

See application file for complete search history.

(56) References Cited

U.S. PATENT DOCUMENTS

| | | | | |
|---|---|---|---|---|
| 3,092,870 | A | 6/1963 | Baer | |
| 3,402,422 | A | 9/1968 | Baer | |
| 4,976,008 | A | 12/1990 | Baer | |
| 5,337,451 | A | 8/1994 | Goossens | |
| 5,636,893 | A | 6/1997 | Wheatley | |
| 5,778,491 | A | 7/1998 | Baer | |
| 5,941,027 | A * | 8/1999 | Hallsten | E06B 3/485 52/246 |
| 6,170,210 | B1 | 1/2001 | Marts | |

(Continued)

FOREIGN PATENT DOCUMENTS

FR 2748770 A1 * 11/1997 ........... E05D 15/242

OTHER PUBLICATIONS

Machine translation of FR-2748770-A1 (Year: 1997).*

*Primary Examiner* — Daniel P Cahn
*Assistant Examiner* — John W Hanes, Jr.
(74) *Attorney, Agent, or Firm* — Haynes and Boone, LLP

(57) ABSTRACT

A hinge includes: a first and second gear; a cover configured to attach the gears; a first outside surface associated with the first panel; a second outside surface associated with the second panel; wherein when the first and second outside surfaces are in a generally co-planer orientation, a tooth from one of the first and second gears fits next to a tooth from the other of the first and second gears to form a water shedding joint. A method of forming a hinge includes: extruding a gear together with a panel having a first outside surface; a second panel a second outside surface; wherein when the first and second outside surfaces are in a generally co-planer orientation, a tooth from one of the first and second gears fits next to a tooth from the other of the first and second gears to form a water shedding joint.

20 Claims, 17 Drawing Sheets

(56) References Cited

U.S. PATENT DOCUMENTS

| | | | | |
|---|---|---|---|---|
| 6,694,568 | B2 * | 2/2004 | Baer | E05D 5/023 16/382 |
| 9,290,974 | B2 * | 3/2016 | Alexander | E05D 3/122 |
| 9,297,190 | B2 * | 3/2016 | Lee | E05D 7/009 |
| 9,428,946 | B2 | 8/2016 | Martinez Garcia | |
| 10,851,569 | B2 | 12/2020 | Narvaez | |
| 11,396,770 | B2 | 7/2022 | Romero | |
| 2015/0330127 | A1 | 11/2015 | Lee | |
| 2018/0002971 | A1 * | 1/2018 | Grace | E06B 3/483 |
| 2019/0264492 | A1 * | 8/2019 | Mitchell | E05D 15/26 |

* cited by examiner

HINGE SYSTEM AND METHOD FOR A SEGMENTED DOOR

RELATED APPLICATIONS

This application claims priority to and is a continuation-in-part of U.S. patent application Ser. No. 16/912,086 entitled "Hinge System and Method for a Segmented Door" filed Jun. 25, 2020. The contents of which are incorporated by reference into this application in their entirety.

TECHNICAL FIELD

This patent disclosure relates generally to a hinge system and, more particularly, to a hinge system for an upward acting segmented door, such as, a garage door.

BACKGROUND

Segmented sectional doors, such as garage doors, have several hinges that allow the sections to pivot with respect to each other. Many types of hinges may be used. Traditional leaf-hinges are bulky and made from sheet metal stampings. Some have crude plated finishes.

There is a desire to change garage door designs to become more aesthetically pleasing. In an effort to have a sleeker door design, current traditional leaf-hinges may be replaced with an alternative hinge system. Examples of hinges are described in U.S. Pat. Nos. 3,092,870; 3,402,422; (both titled "Hinge" and U.S. Pat. No. 4,976,008 titled "Multi-Piece Thrust Bearing Assembly for a Hinge Structure" all of which are incorporated herein by reference in their entirety.

Traditional hinges typically require several screws with self-drilling and serrated self-locking features. These hinges may be labor intensive to install. It would be desirable to have more aesthetically looking hinges that are require fewer fasteners, fewer hardware components, and are less labor intensive to install.

SUMMARY

The foregoing needs are met to a great extent by embodiments in accordance with the present disclosure, wherein, in some embodiments allows in one aspect, a hinge for movably attaching two parts together the hinge includes: a first gear on a first panel; a second gear on a second panel; a cover configured to attach the first gear to the second gear; a first outside surface associated with the first panel; a second outside surface associated with the second panel; wherein when the first and second outside surfaces are in a generally co-planer orientation, a tooth from one of the first and second gears fits next to a tooth from the other of the first and second gears to form a water shedding joint between the first and second panel.

In another aspect, the disclosure describes a hinge for movably attaching two parts together. The hinge includes: a first gear on a first panel; a second gear on a second panel; a cover configured to attach the first gear to the second gear; a first outside surface associated with the first panel; a second outside surface associated with the second panel; wherein when the first and second outside surfaces are in a generally co-planer orientation, at least most of the weight associated with the first panel is supported by the second gear.

In yet another aspect, the disclosure describes a method of forming a hinge. The method includes: extruding a first gear together with a first panel having a first outside surface associated with the first panel; extruding a second gear together with a second panel a second outside surface associated with the second panel; forming a cover configured to attach the first gear to the second gear; wherein when the first and second outside surfaces are in a generally co-planer orientation, a tooth from one of the first and second gears fits next to a tooth from the other of the first and second gears to form a water shedding joint between the first and second panel.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

Figure 1:
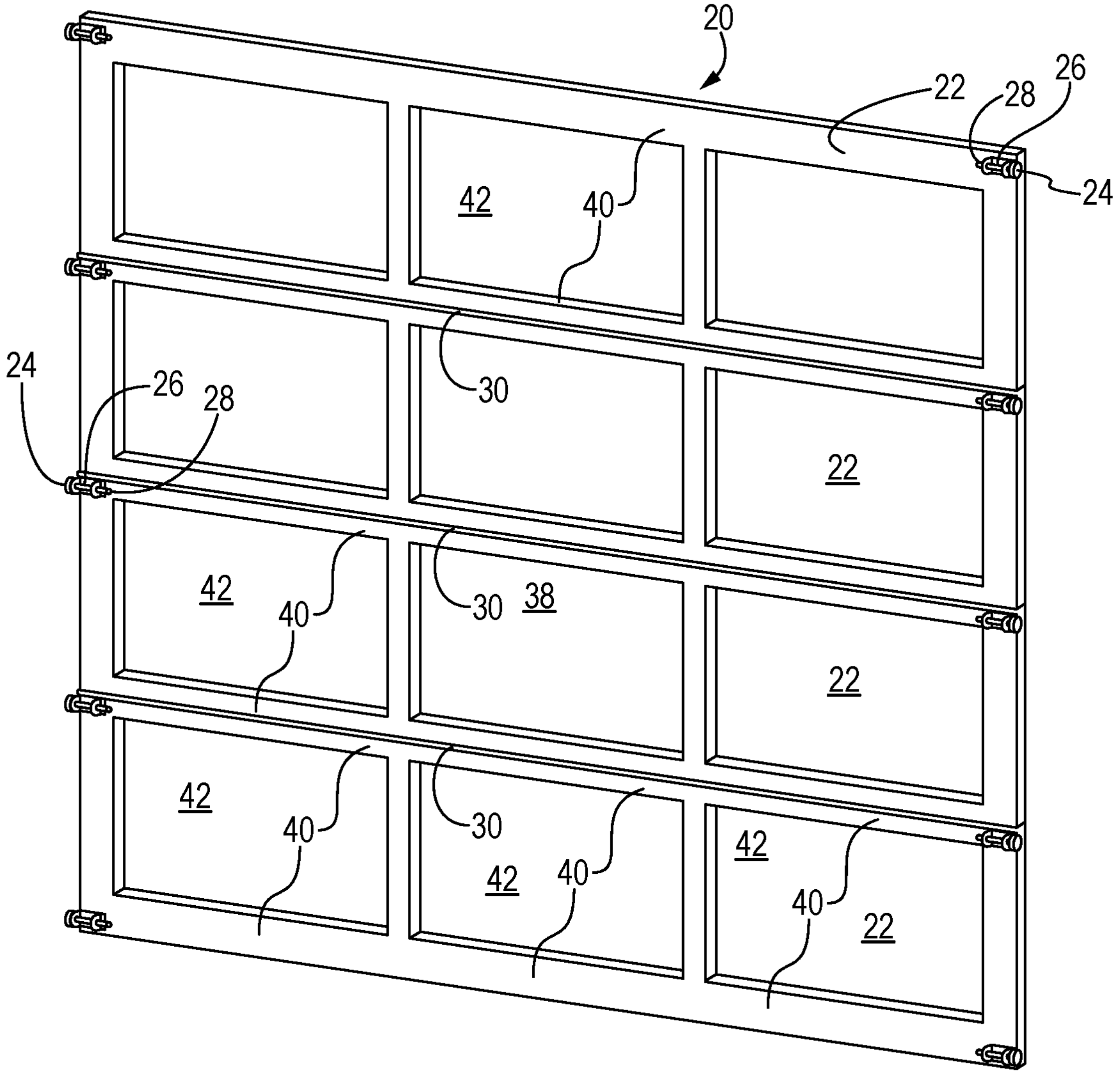
FIG. 1 is a perspective rear view of an upward acting segmented door.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

Figure 2:
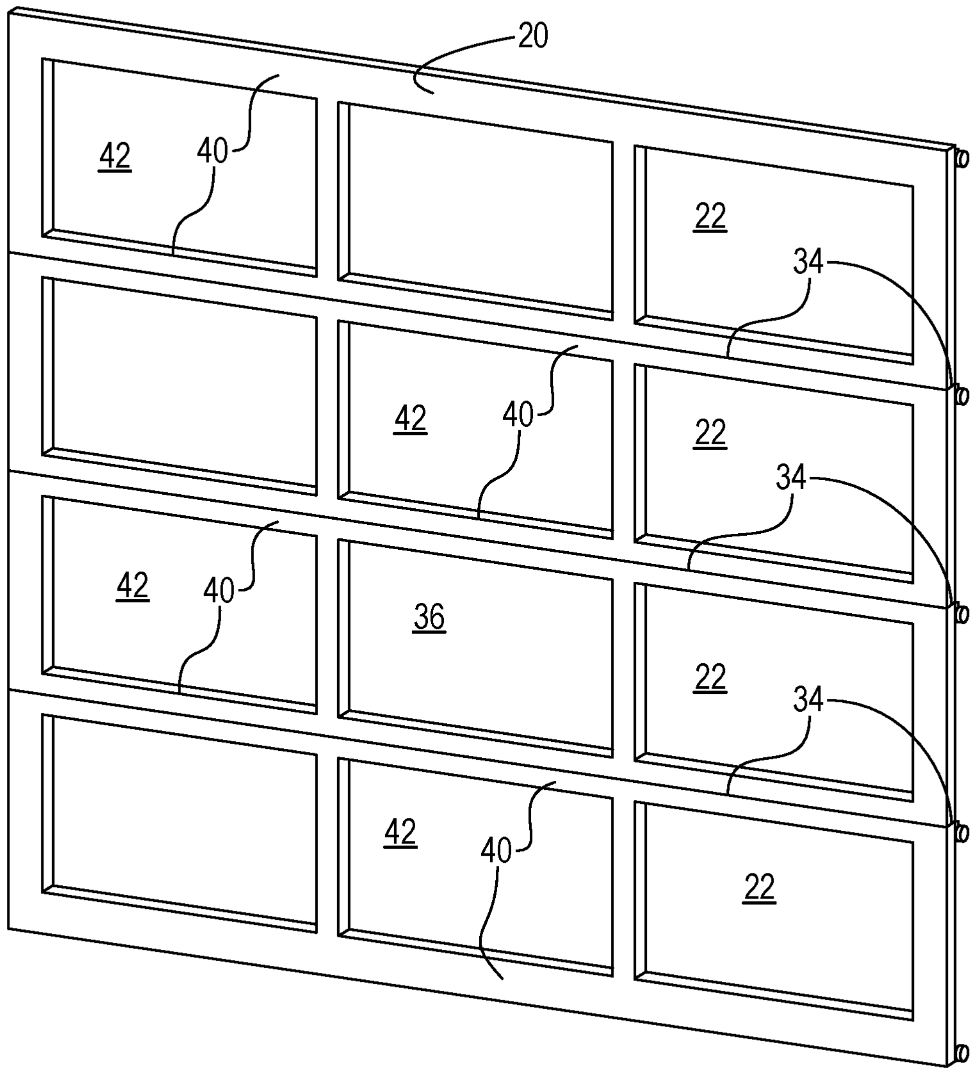
FIG. 2 is a perspective front view of an upward acting segmented door.

FIGS. 1 and 2 show an interior and exterior perspective view of an upward acting segmented door 20. Such a door 20 may be used, for example as a residential garage door 20. Other uses for such a segmented door 20 may include commercial uses such as warehouses, fire houses, loading docks and the like. These examples are exemplary and not limiting.

The segmented door 20 is made of several panels 22 which may also be referred to as segments 22. The door 20 has wheels 24 located on the segments 22. The wheels 24 are supported and attached to the segments 22 by wheel brackets 26 via a wheel axle 28. The wheels 24 allow the door 20 to move along a track (not shown).

FIG. 1 shows a back side 38 of the door 20 which may sometime be referred to as the interior side 38. FIG. 2 shows the front side 36 of the door 20 which may also be referred to as the exterior side 36 of the door 20.

As shown in FIG. 1, a retainer 30 which may also be referred to as a hinge cover 30 covers a hinge 32. The hinge 32 connected various segments 22 and allow the segments 22 to move in a pivoting-like manner with respect to each other. The segments 22 form a joint 34 where the segments 22 come together.

Figure 3:
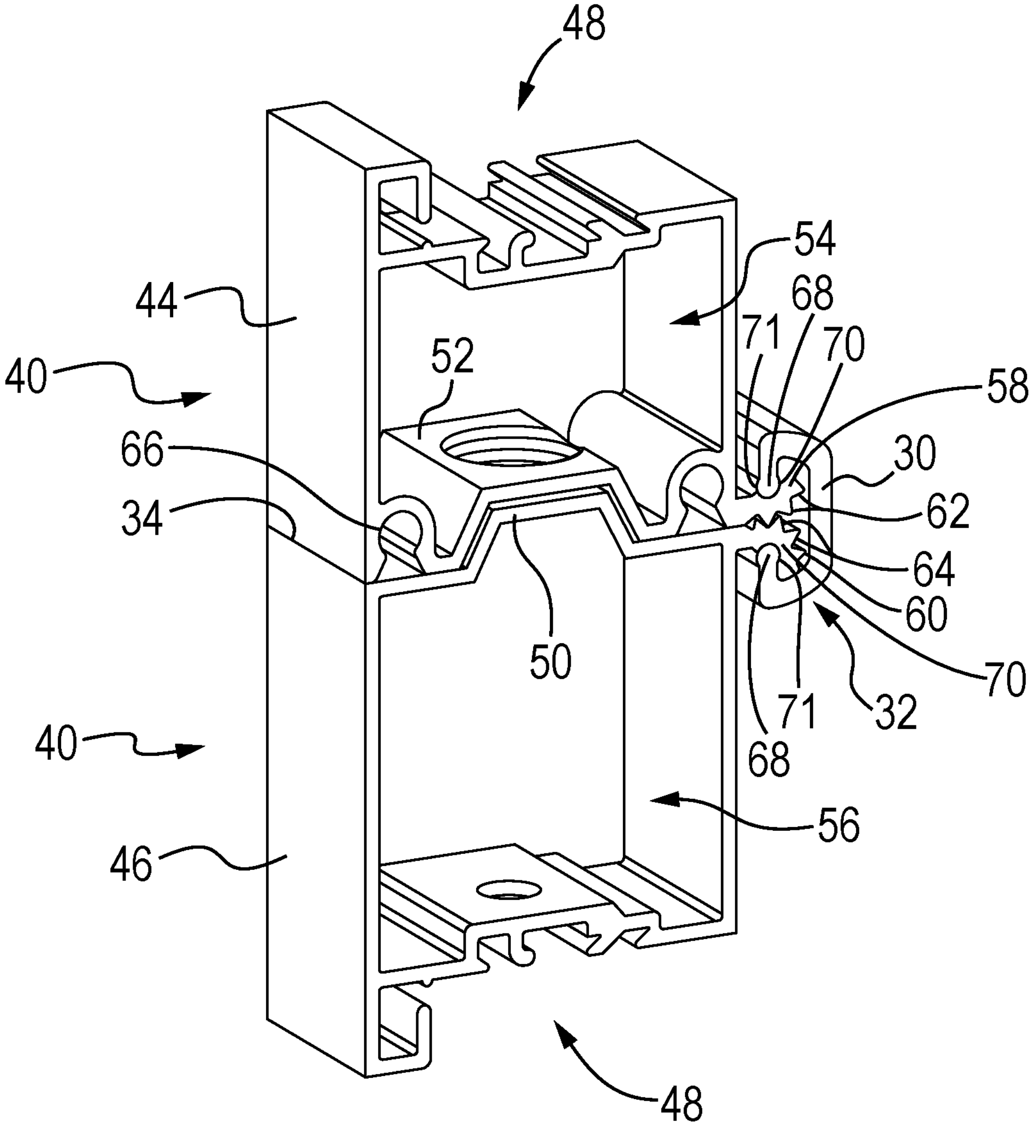
FIG. 3 is a perspective view of panel frames and a hinge in a closed position.
Figure 4:
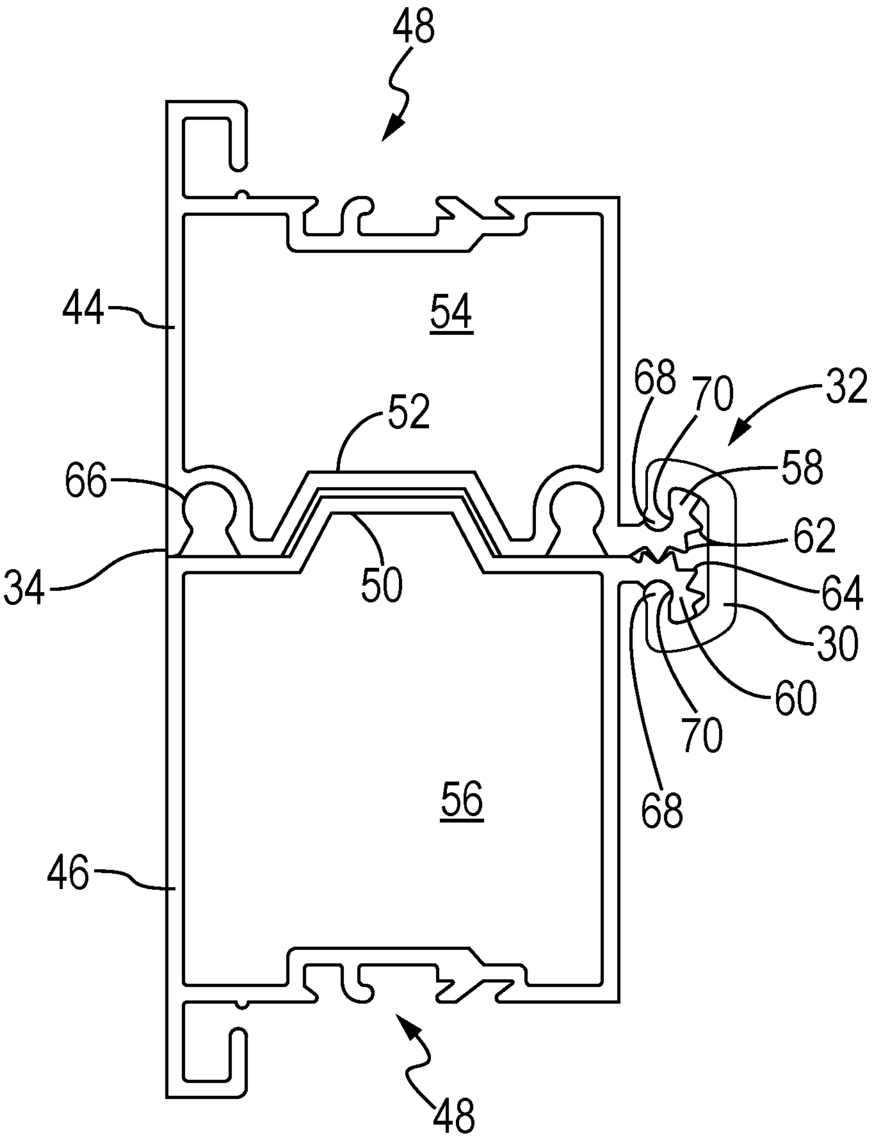
FIG. 4 is a side view of panel frame and hinge in a closed position.
Figure 5:
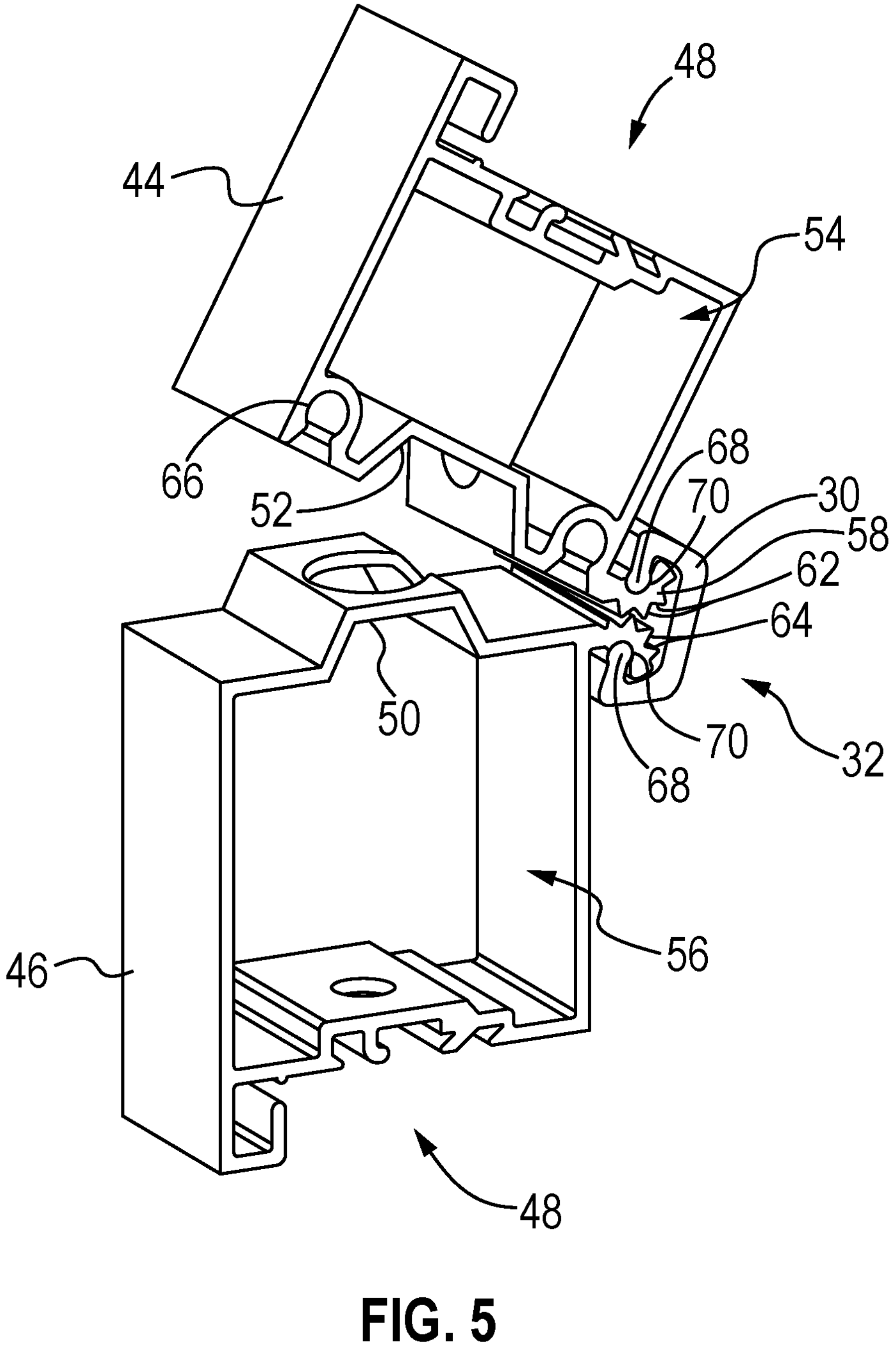
FIG. 5 is a perspective view of panel frames and a hinge in an open position.
Figure 6:
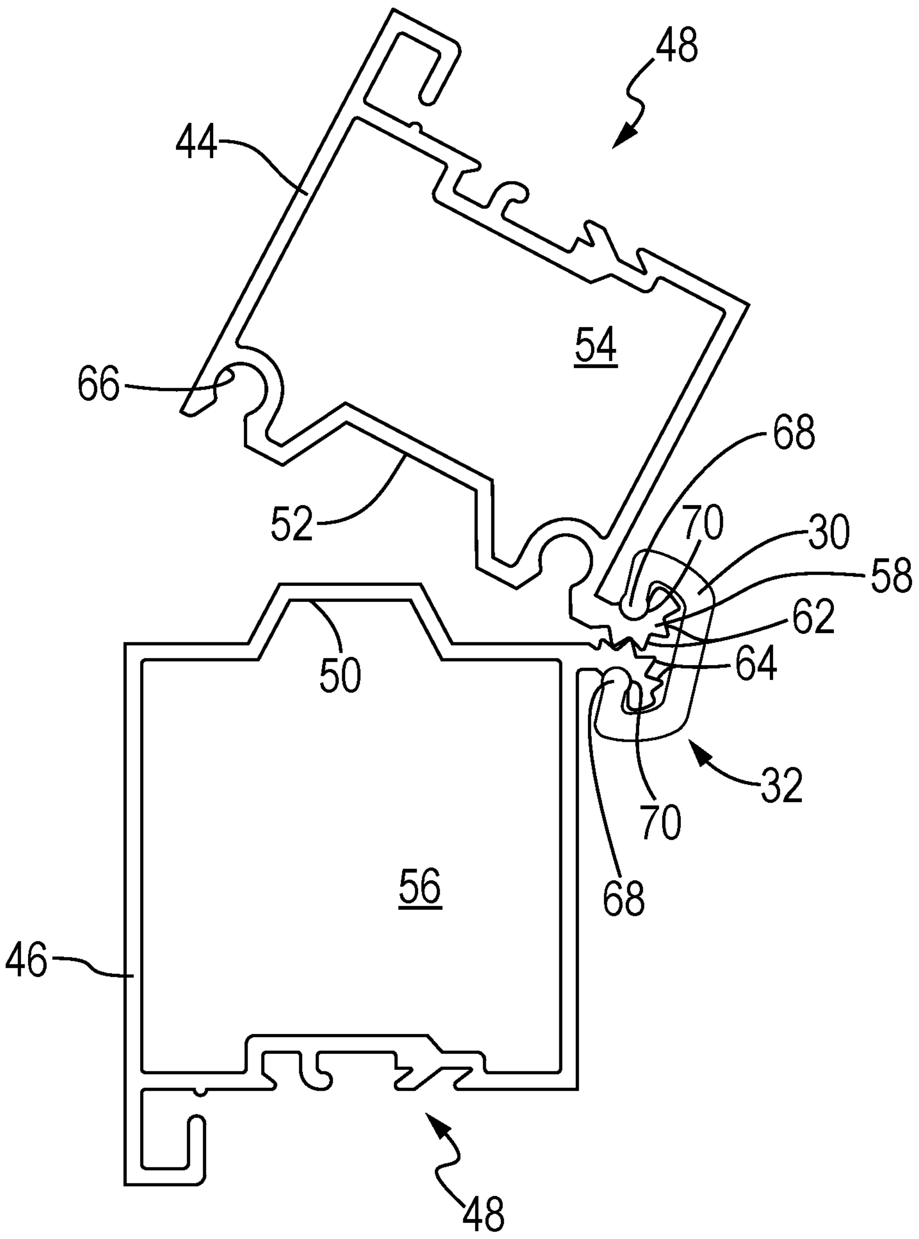
FIG. 6 is a side view of panel frames and a hinge in an open position.

The panels 22 or segments 22 may be a single unitary piece, comprised of several wood or other sections, or as shown, made of a frame 40 and an insert 42. The insert 42 may be a window, a panel or other type of insert 42. As shown, for example in FIG. 3, the frame 40 may include a first frame portion 44 which may be the lower part of the frame 40 on a panel 22 and a second frame section 46 which is the upper part of the frame 40. As shown in FIG. 3, a lower frame portion 44 is on a panel 22 located above the upper frame section 46 on a panel 22 located below.

As shown in FIGS. 3-6, the first and second frame portions 44, 46 include attaching structure 48 for attaching the first frame portion 44 to an insert 42 (see FIG. 1 or 2). The first 44 and second 46 frame sections are configured to fit together at the joint 34. The joint 34 may be a water shedding joint such as tongue & groove, shiplap, or the like. The first and second frame portions 44 and 46 may have a projecting portion 50 that fits into a complimentary concave portion 52. The frame portions 44 and 46 may define hollow portions 54 and 56.

The first and second panel frames 44 and 46 are equipped with a first gear 58 and a second gear 60 respectively. The first gear 58 has first gear teeth 62 and the second gear 60 has second gear teeth 64. When the hinge 32 is actuated, the gear teeth 62 and 64 mesh together to cause the first panel frame 44 (and therefore one panel 22) and second panel frame 46 (and therefore a second panel) to move in a pivot-like movement with respect to each other. Optionally, the first and second panel frames 44 and 46 may also include one or more cavities 66 for locating a seal.

The first and second gears 58 and 60 are held together by the cover 30 also referred to as a retainer 30. The cover 30 has two rounded projections 68 that fit into corresponding receiving structure 70. When the hinge 32 is actuated the rounded projection 68 and corresponding receiving structure 70 slide on sliding surfaces 71 (noted in FIG. 3) on the rounded projection 68 and corresponding receiving structure 70 with respect to each other.

FIGS. 1, 2, 3, 4, 7A, 8, 9, 10, 13 and 14 show the hinge 32 and first 40 and second 44 panel frames in a closed position. FIGS. 5, 6, 11, and 12 show the hinge 32 and first 40 and second 44 panel frames in an open position where the gear teeth 62 and 64 are meshed and have rotated with respect to each other. In both cases, the cover 30 is retaining the first gear 58 with the second gear 60.

In some embodiments the panel frames 40 and particularly, the first and second frames 44 and 46, are extruded. They may be aluminum or any other suitable substance. The first and second frames 44 and 46 are extruded along with the first and second gears 58 and 60 so that the gears 58 and 60 are unitized and with and conformed with the panel frames 44 and 46. In some embodiments the panel frames 44 and 46 have substantially uniform cross-sections which is often a characteristic of extruded parts.

Figure 7A:
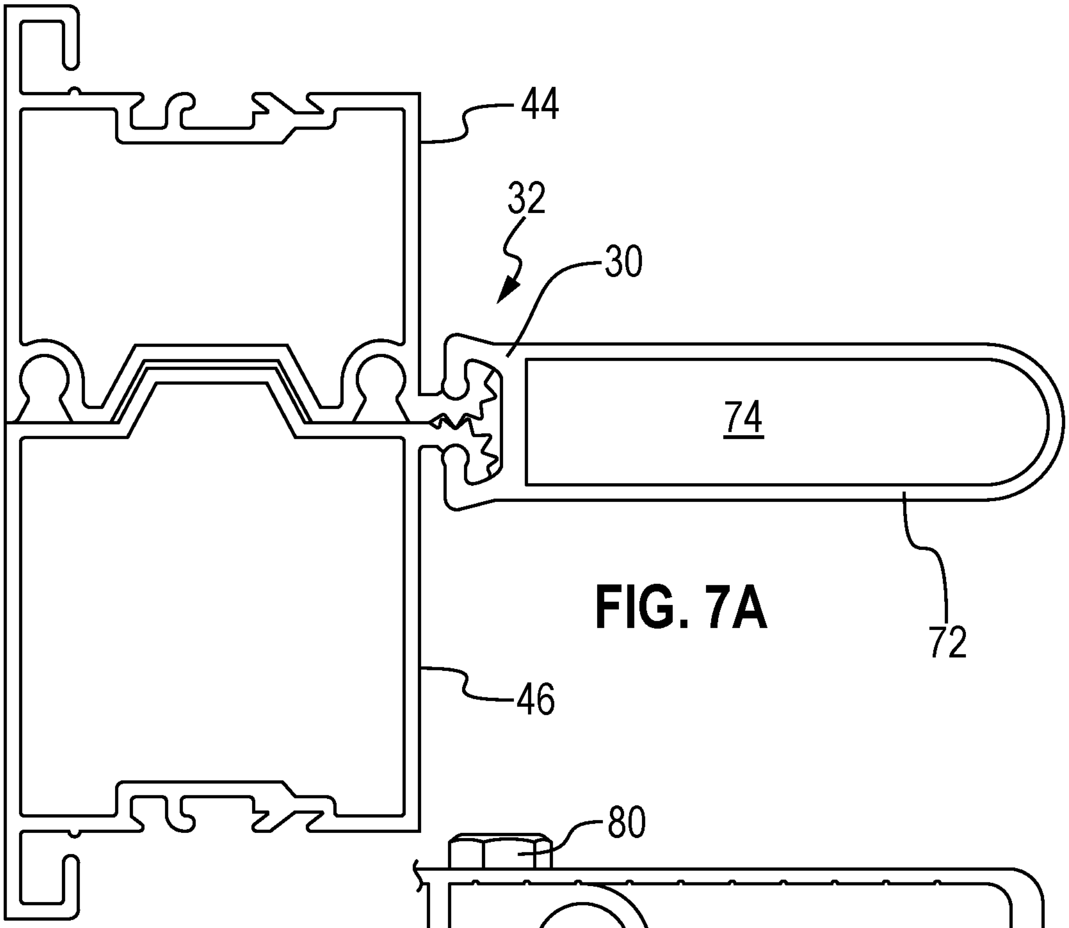
FIGS. 7A and 7B are side views of panel frames and a hinge with an alternate hinge cover.
Figure 7B:
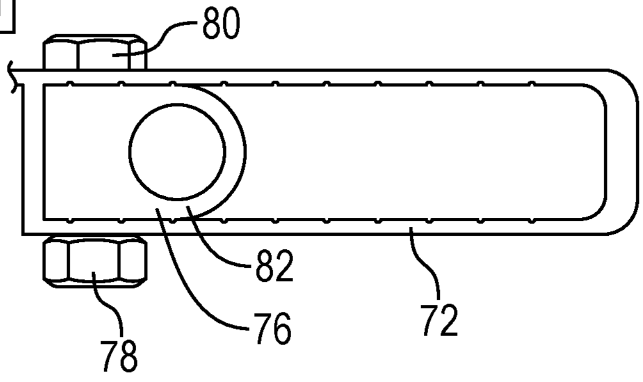
Figure 8:
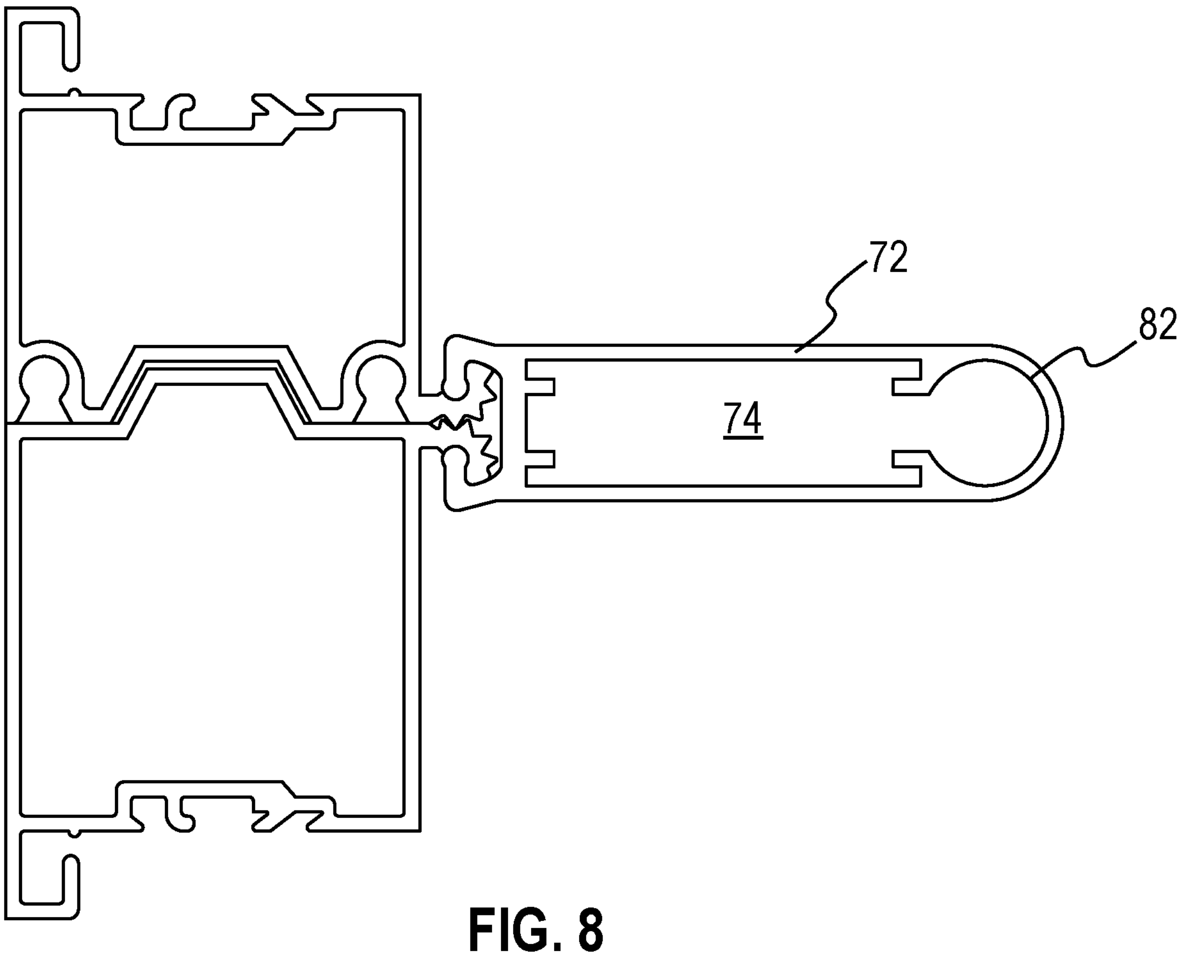
FIG. 8 is a side view of panel frames and a hinge with another alternate hinge cover.
Figure 9:
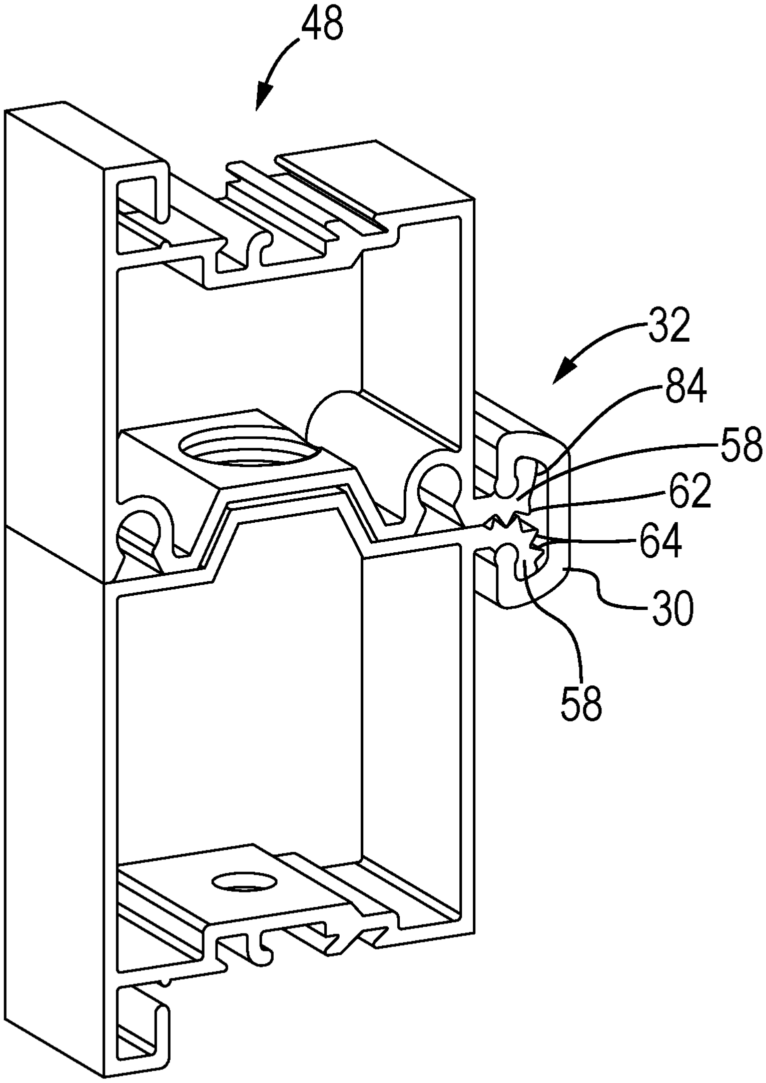
FIGS. 9-14 are similar to FIGS. 3-6, 7A, and 8 with a different hinge.
Figure 10:
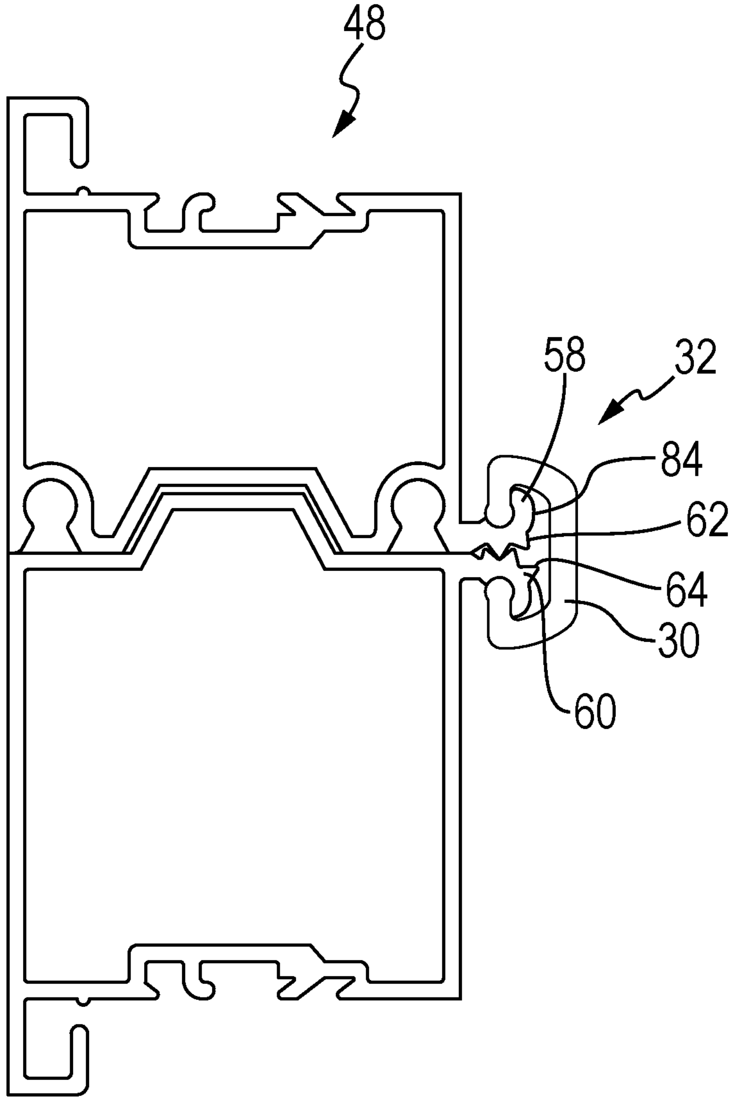
Figure 11:
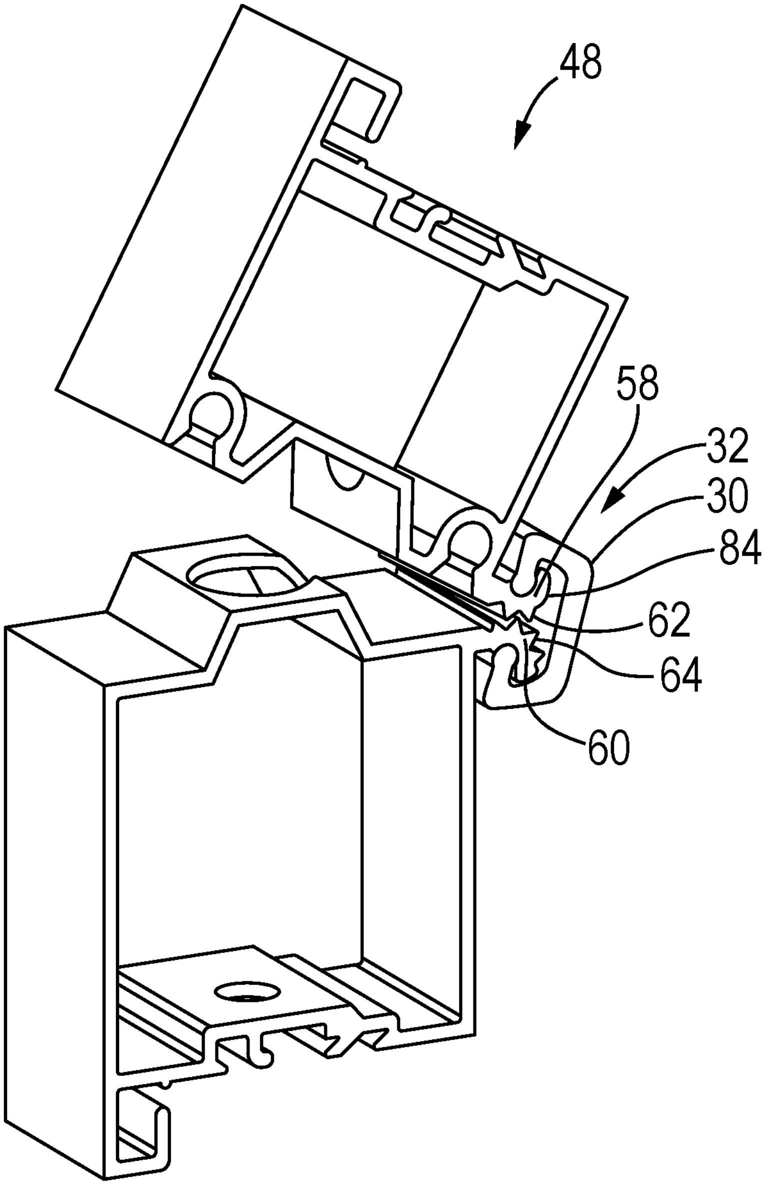
Figure 12:
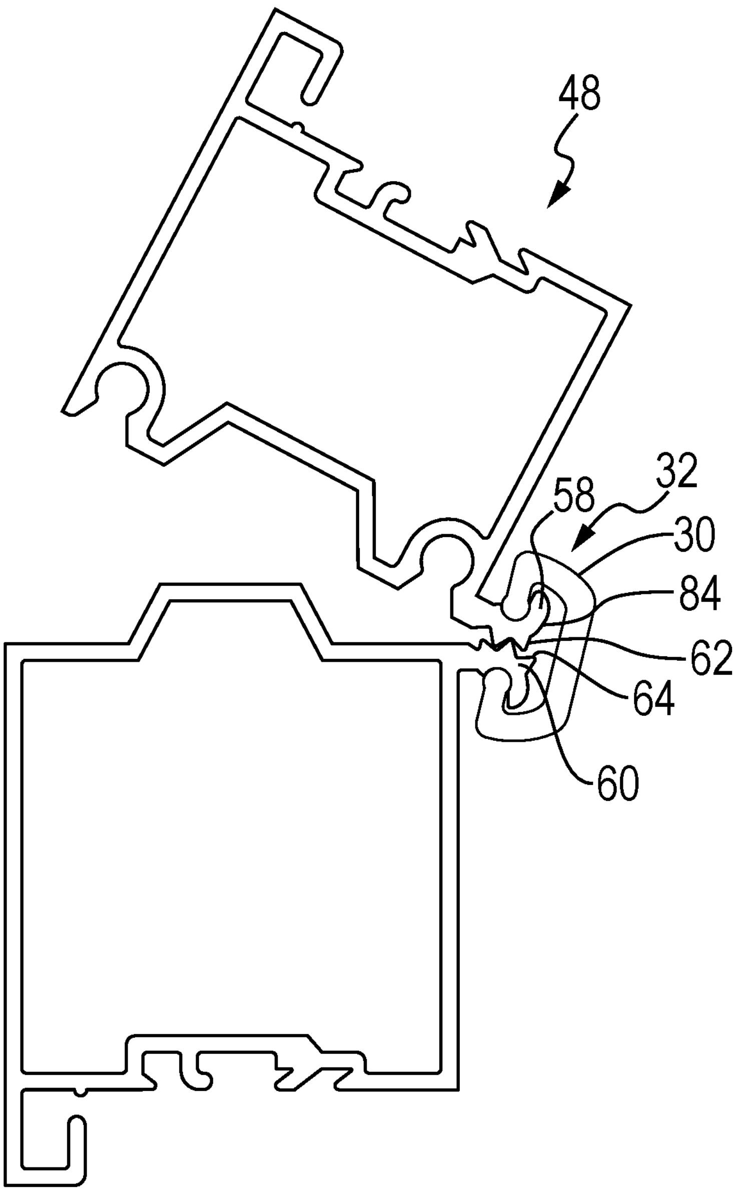
Figure 13:
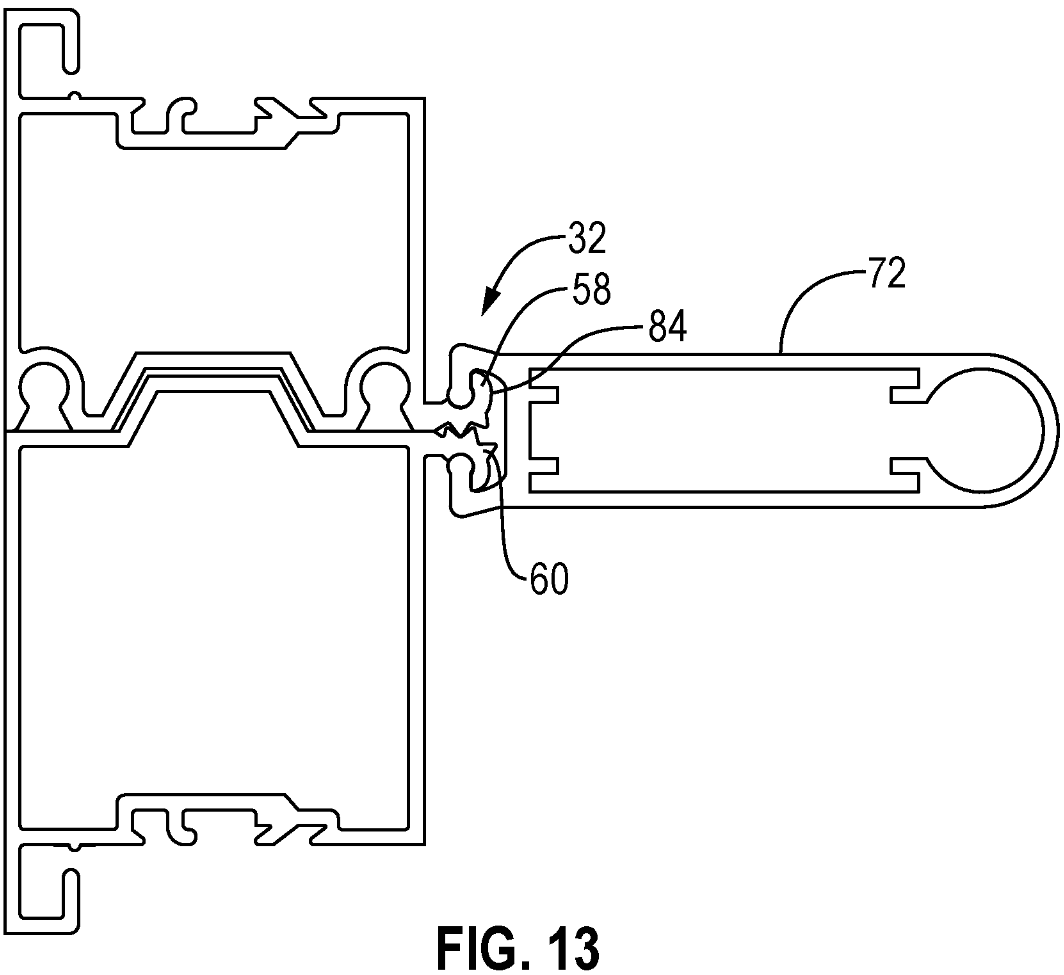
Figure 14:
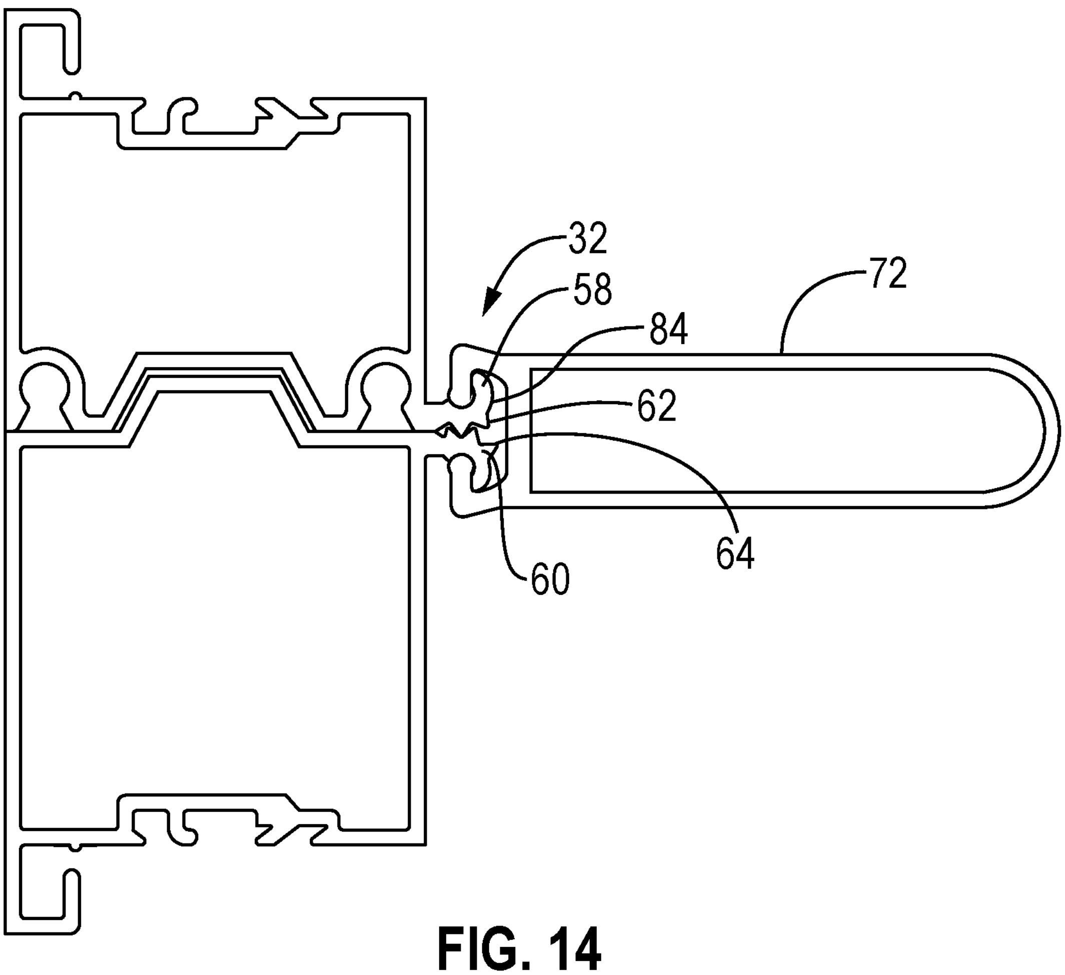
Figure 15:
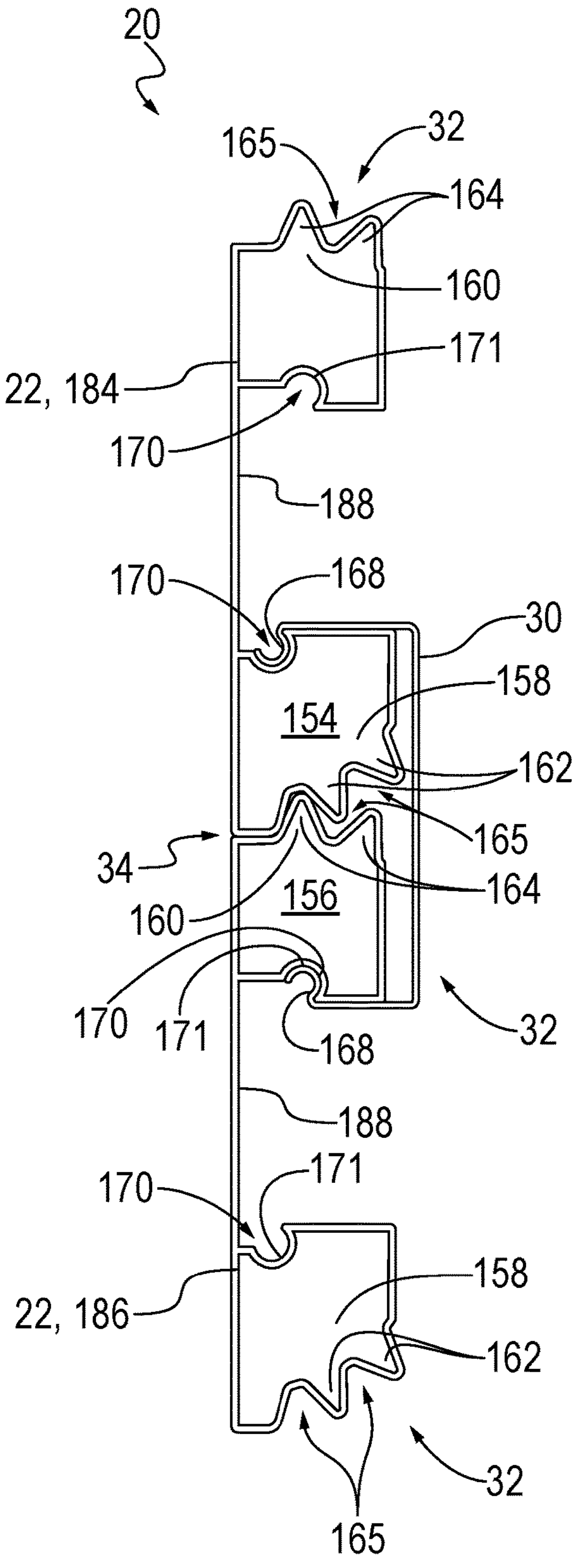
FIGS. 15-20 illustrate a side view of panel frames at different orientations with respect to each other of another embodiment of a hinge in accordance with the present disclosure.
Figure 16:
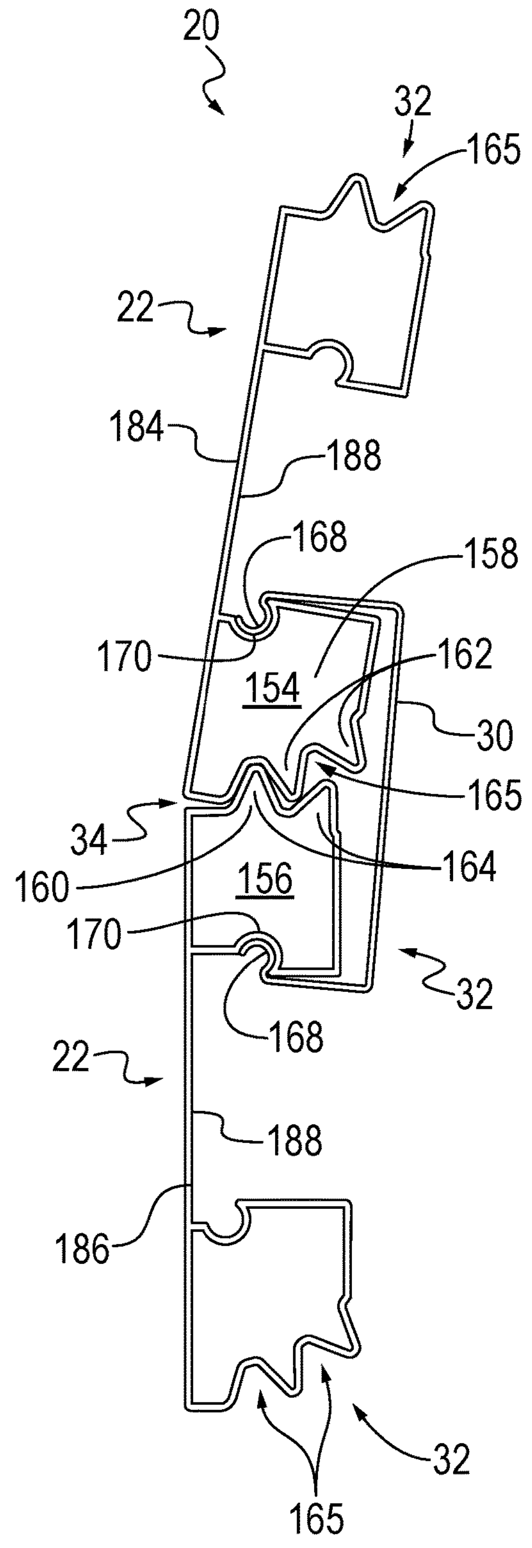
Figure 17:
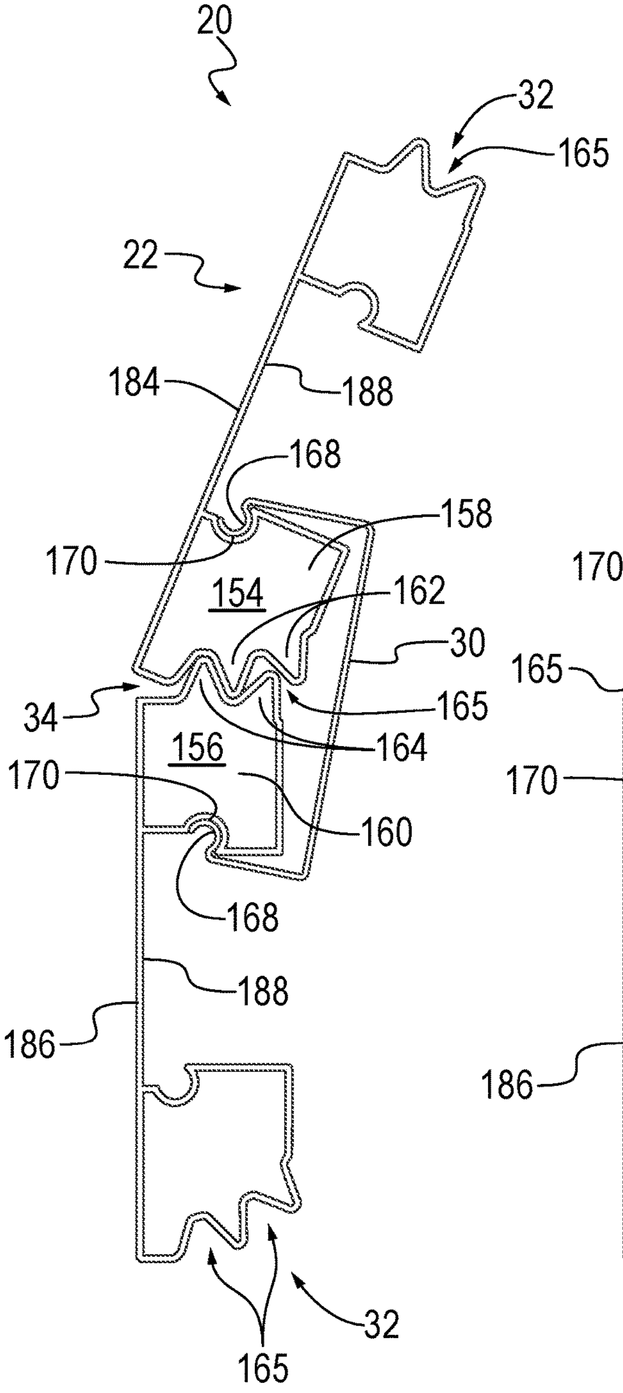
Figure 18:
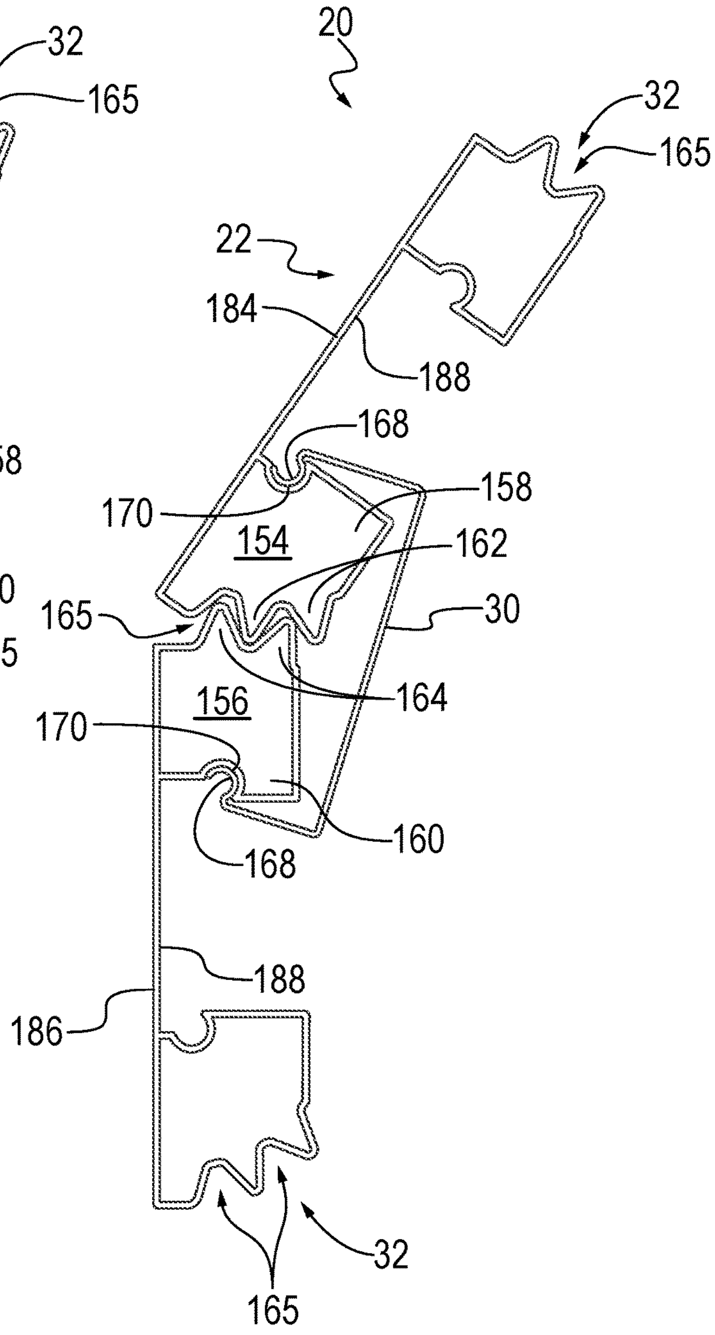
Figure 19:
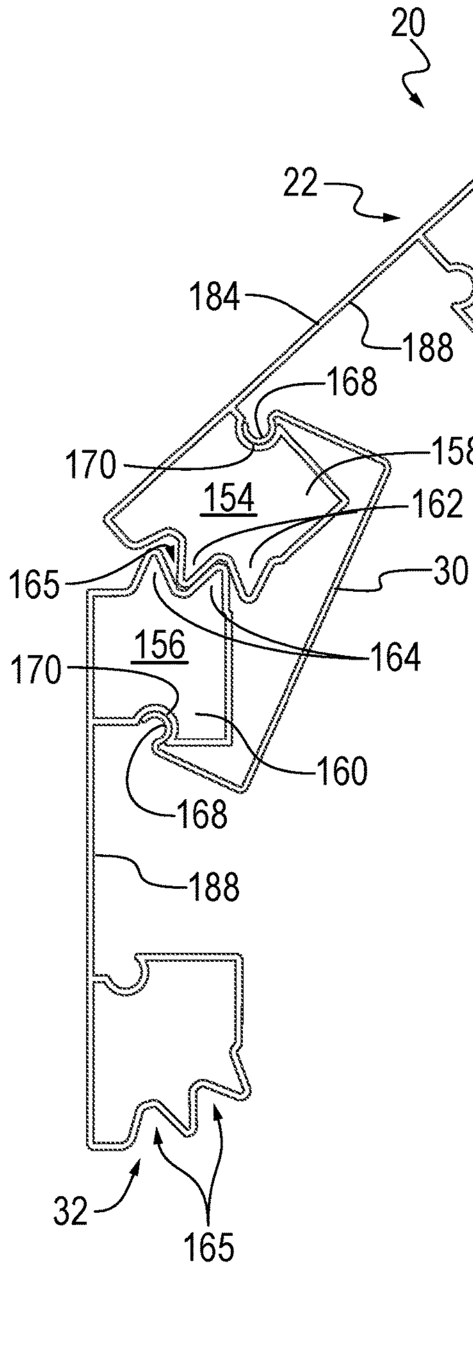
Figure 20:
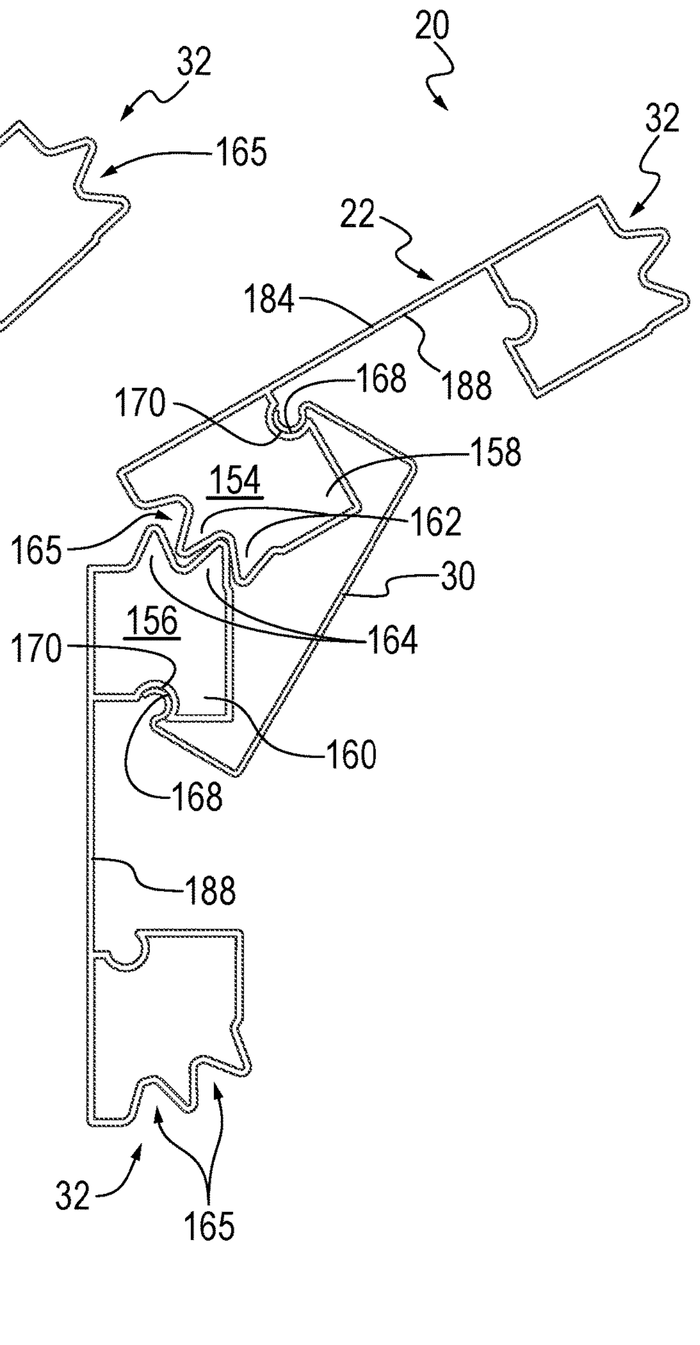

FIGS. 7A, 7B, and 8 illustrate an embodiment where the cover 30 is integrated with an elongated body 72. In some embodiments the elongated body 72 is hollow and defines a cavity 74. One purpose of the elongated body 72 on the cover 30 is be a stiffener and strengthen the hinge 32 and/or door 20 (See FIGS. 1 and 2).

FIGS. 7B and 8 show how the elongated body 72 may attach to an axle bracket 76. The axle bracket 76 may be modified from the axle bracket 26 discussed above to accommodate being attached to the elongated body 72. In FIG. 7B the axle bracket 76 is attached to the elongated body 72 by use of an axle bracket bolt 78 and an axle bracket nut 80. In both FIGS. 7B and 8, the round hole 82 is for the wheel axle 28 (see FIGS. 1 and 2) to reside in.

FIGS. 3, 4, 5, 6, 7A, and 8 show an embodiment where the hinge 32 has gears 58 and 60 of substantially mirror image geometry (other than perhaps placement of gear teeth 62 and 64). Such a hinge 32 is typically constructed by aligning the gears 58 and 60 sliding on the cover 30. While this method of assembly works well it can be cumbersome in embodiments with long covers 30. The cover 30 may be extruded the full length of the hinge 32 or be extruded or cut into several lengths to form the full length of the hinge 32.

Optionally, the hinge 32 may be made of alternate components as described below to make the hinge 32 easier to assemble.

FIGS. 9-14 show a hinge 32 where the first 58 and second gear 60 differ from each other. To aid in assembly of the hinge 32, one or the other of the first 58 and second gears 60 has an area of no teeth 84. In some embodiments the gear with the area 84 of no teeth will have fewer teeth than the other gear.

Having an area 84 of no teeth is useful for assembling the hinge 32. The gear with no untoothed area 84 (in the FIGS. second gear 60) is moved into the cover 30. Then the gear with the area 84 having no teeth (in the FIGS. this is the first gear 58) is rotated so the area 84 of no teeth can slide over the teeth 64 of the second gear 60 and into the cover 30. The gear 58 with the area 84 of no teeth can then be rotated to allow the first teeth 62 on the first gear 58 mesh with the second gear teeth 64 on the second gear 60 as shown in FIGS. 9-14. Once assembled, the hinge 32 of FIGS. 9-14 operates similar to the hinge 32 of FIGS. 3-8.

In some embodiments, as shown in FIGS. 15-20 the joint 34 may include first 158 and second 160 gears in such a manner as to obviate the need for a projecting portion 50 (see for example FIGS. 3-6) fitting into a corresponding complimentary concave portion 52 which still, at least for the most part, retain the water shedding features of the joint 34 where a projecting portion 50 and a complimentary concave portion 52 are used. In such embodiments shown in FIGS. 15-20 the door 20 includes panels or segments 22. The panels or segments 22 may be formed similar to the embodiments discussed above and form a door 20 having wheels 24, brackets 26, wheel axles 28 (see FIGS. 1-2) as discussed above.

In the embodiment shown in FIGS. 15-20 the hinge 32 is oriented differently than the embodiments of FIGS. 3-14. While the hinge 32 is different, the doors 20 incorporating the hinge 32 of FIGS. 15-20 are substantially similar as those showing in FIGS. 1-2 and use wheels 24, wheel axles 28, brackets 26 as described above. The hinge 32 may be weight bearing. The hollow portions 154 and 156 may be part of the first gear 158 and/or the second gear 160. The hollow portions 154 and 154 may be defined and/or located above or below the first gear teeth 162 and second gear teeth 164 of the first gear 158 and second gear 160.

In some embodiments, door 20 is made of several panels or segments 22 where each segment 22 has an upper profile 158 and a lower rail profile 186 also referred to as upper and lower or first and second gears 158 and 160. The top most segment 22 may only have a lower (second) gear 160 and the lower most segment may only have a upper (first) gear 158. The panels 22 may be places in an upper or top panel 184 and lower or bottom 186 configuration such that the first gear 158 is on the top panel 184 and the second gear 160 is on the bottom panel 186. The area 188 between the hinges 32 on the panels 22 appears in the FIGS to be very thin. It should be appreciated that the FIGS. are not drawn to scale and features that may be present in the panels such as insulation are not shown as they are not relevant to the hinges 32 to which the present disclosure is generally directed. The panels 22 may be thicker then shown and incorporate stiles, insulation, reinforcing members other features used in doors.

The first and second gears 158 and 160 may be roll-formed, extruded, molded, or otherwise suitably fabricated. They may be formed with the panels 22 (for example extruded along with the panel 22) or in other embodiments, attached via fasteners, welding, or in some other suitable manner. The first and second gears 158 and 160 engage with each other to form a water-sheading joint 34. In such embodiments, the first and second gears 158 and 160 engage with each other to form a tongue and groove type section joint 34. The first or second gear teeth 162, 164 form the tongue portion of the tongue & groove type section joint and the areas 165 between the teeth 162, 164 from the grooves of the tongue & groove type section joint. The first and second gear teeth 162, 164 may include an involute profile as typically found on gears or any other suitable shape and may operate by conjugate action as the first and second gear teeth 162, 164 interact with each other.

A cover 30 which may be roll formed steel, extruded aluminum or formed by any other suitable method, fastens the first gear 158 to the second gear 160. The cover 30 holds the hinge 32 together by keeping the first 158 and second 160 gears together. The cover 30 may have projections 168 that fit into receiving structure 170 on the first 158 and second gear 160. The receiving structure 170 and the projections 168 have sliding surfaces 171 that slide against each other as the segments 22 rotate with respect to each other as show in progression in FIGS. 15-20. As will be appreciated, the segments 22 will rotate at the first 158 and second gears 160 as the door 20 moves along a track as the door 20 moves between a vertical orientation and a horizontal orientation.

It will be understood that the first 158 and second 160 gears may, in some embodiments, extend along the length of the door 20 as well as the cover 30 may extend along the length of the segments 22 and door 20 as shown in FIG. 1. In some embodiments, a single long cover 30 may be used for the hinge 32. In such an instance, the cover may be long and unwieldy to slide or snap into place. In other embodiments, the cover 30 may be made of several shorter smaller segments that can be installed onto the hinge 32 by sliding or snapping into place. The shorter smaller segments may extend along the entire length of the hinge 32. The cover 30 may be roll formed steel, extruded aluminum or be made or formed of any other suitable materials and by any suitable technique.

The hinge 32 shown in the various embodiments described herein and shown in the attached FIGS. may be stronger than known discreet hinged placed intermittently along the section 22 joints 34. The continuous geared hinge 32 shown and described herein distributes the weight of the panels 22 evenly along the full length of the panels 22/door 20 at each section joint 34, making the door 20 stronger. A stronger door 20 may be particularly useful for larger doors 20 and/or doors subjected to higher wind loads. Doors 20 equipped with hinges 32 described herein may be more reliable and require less maintenance than traditional hinges. Hinges 32 described herein with their tongue and groove configuration of gear teeth 162, 164 may close gaps between panels 22 rendering doors 20 so equipped more resistant to air and/or moisture penetration than doors 20 equipped with traditional hinges.

Further, doors 20 equipped with hinges 32 described in some embodiments therein are integral with the panels 22 and thereby do not require fasteners and associated labor of attaching the hinges with fastener to the panels 22. In fact, in some embodiments, the hinges 32 may be roll formed or extruded along with the panels 22 thereby formed at the same time as the panels 22 themselves. As such, the hinges 32 may be integrated with the panels 22 and therefore not need fasteners to attach to the panels 22.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

I claim:

1. A hinge for movably attaching two parts together comprising:

a first gear defined by a wall of a first hollow frame portion of a first panel, wherein the first hollow frame portion extends into a tooth of the first gear;

a second gear defined by a wall of a second hollow frame portion of a second panel, wherein the second hollow frame portion extends into a tooth of the second gear;

a cover configured to attach the first hollow frame portion to the second hollow frame portion;

a first outside surface and a first inside surface, the first outside and first inside surfaces each associated with the first panel; and a second outside surface and a second inside surface, the second outside and second inside surfaces each associated with the second panel;

wherein when the first and second outside surfaces are in a generally co-planer orientation, a tooth from one of the first and second gears fits next to a tooth from the other of the first and second gears to form a water shedding joint between the first and second panel, the tooth from the first gear and the tooth from the second gear each being disposed between at least one of the first and second outside surfaces and at least one of the first and second inside surfaces.

2. The hinge of claim 1, further comprising a first protrusion opposite a second protrusion on the cover.

3. The hinge of claim 2, further comprising a first sliding surface on the first protrusion and a second sliding surface on the second protrusion.

4. The hinge of claim 2, wherein the first protrusion is dimensioned to fit in a first recess in the first gear and the second protrusion is dimensioned to fit in a second recess in the second gear.

5. The hinge of claim 4, wherein the first and second protrusions keep the first and second gears engaged with each other.

6. The hinge of claim 1, wherein the hinge is actuated by meshing gear teeth on the first gear with gear teeth on the second gear.

7. The hinge of claim 1, wherein the first gear, second gear, and cover have cross-sections and a length and the cross-sections are substantially consistent throughout their respective lengths.

8. The hinge of claim 7, wherein the first gear, second gear, and cover are extruded.

9. The hinge of claim 1, further comprising a segmented door comprised of at least two panels.

10. The hinge of claim 1, wherein at least one of either the first gear and second gear is extruded as at least part of the first panel or the second panel.

11. The hinge of claim 1, wherein the cover is comprised of multiple segments located along a length of the hinge.

12. The hinge of claim 1, wherein at least most of a weight associated with the first panel is supported by the second gear.

13. A hinge for movably attaching two parts together comprising:

a first gear defined by a wall of a first hollow frame portion of a first upper panel, wherein the first hollow frame portion extends into a tooth of the first gear;

a second gear defined by a wall of a second hollow frame portion of a second lower panel, wherein the second hollow frame portion extends into a tooth of the second gear;

a cover configured to attach the first hollow frame portion to the second hollow frame portion;

a first outside surface associated with the first upper panel; and a second outside surface associated with the second lower panel;

wherein when the first and second outside surfaces are in a generally co-planer orientation, at least most of a weight associated with the first upper panel is supported by the second gear.

14. The hinge of claim 13, wherein the hinge is located on a segmented door comprised of at least two panels and at least one of either the first gear or second gear is extruded as part of the first upper panel or second lower panel of the segmented door.

15. The hinge of claim 13, wherein the cover is extruded.

16. A method of forming a hinge comprising:

extruding a first gear defined by a wall of a first hollow frame portion together with a first panel having a first outside surface and a first inside surface, the first outside and first inside surfaces each associated with the first panel, wherein the first hollow frame portion extends into a tooth of the first gear;

extruding a second gear defined by a wall of a second hollow frame portion together with a second panel a second outside surface and a second inside surface, the second outside and second inside surfaces each associated with the second panel, wherein the second hollow frame portion extends into a tooth of the second gear; and forming a cover configured to attach the first hollow frame portion to the second hollow frame portion;

wherein when the first and second outside surfaces are in a generally co-planer orientation, a tooth from one of the first and second gears fits next to a tooth from the other of the first and second gears to form a water shedding joint between the first and second panel, the tooth from the first gear and the tooth from the second gear each being disposed between at least one of the first and second outside surfaces and at least one of the first and second inside surfaces.

17. The method of claim 16, further comprising attaching a first segment of a segmented door to a second segment of the segmented door with the cover.

18. The method of claim 17, moving the first segment with respect to the second segment by rotating the first gear with respect to the second gear.

19. The method of claim 16, further comprising forming a segmented door by stacking the first panel on top of the second panel and attaching the first and the second panel together with the cover.

20. The method of claim 19, further comprising supporting a weight of the first panel with the second gear.

* * * * *